(12) United States Patent
Dove

(10) Patent No.: US 6,385,175 B1
(45) Date of Patent: May 7, 2002

(54) METHOD AND APPARATUS FOR ROUTING SERVICE REQUEST/AGENT PROGRAMS TO SERVICE PROVIDED SITES WHEREIN SAID PROGRAMS COMPRISE OF A LIST OF THE SITES VISITED

(75) Inventor: Lee G. Dove, Scotland (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/144,868

(22) Filed: Sep. 1, 1998

(30) Foreign Application Priority Data

Jan. 10, 1998 (GB) .............................................. 9800430

(51) Int. Cl.[7] .............................................. H04L 12/28
(52) U.S. Cl. ...................................... 370/255; 370/475
(58) Field of Search ................................ 370/351, 389, 370/395, 445, 466, 469, 254, 255, 257, 241, 248, 252, 400–2, 449, 453, 457, 475

(56) References Cited

U.S. PATENT DOCUMENTS

| | | | |
|---|---|---|---|
| 5,325,524 A | | 6/1994 | Black et al. |
| 5,598,410 A | * | 1/1997 | Stone .......................... 370/469 |
| 5,701,484 A | | 12/1997 | Artsy |
| 6,039,245 A | * | 3/2000 | Symonds et al. ........... 235/379 |
| 6,064,990 A | * | 5/2000 | Goldsmith |
| 6,073,727 A | * | 6/2000 | DiFranza et al. ........... 187/396 |
| 6,154,879 A | * | 11/2000 | Pare, Jr. et al. ................. 902/3 |
| 6,185,203 B1 | * | 2/2001 | Berman ....................... 370/351 |

FOREIGN PATENT DOCUMENTS

| | | |
|---|---|---|
| EP | 0455402 | 11/1991 |
| WO | 9423383 | 10/1994 |

* cited by examiner

*Primary Examiner*—David Vincent
(74) *Attorney, Agent, or Firm*—Gates & Cooper LLP

(57) ABSTRACT

The present invention relates to a communications network comprising a plurality of network sites. Such a network may include the Internet. Agent programs are switched through the communications network by reference to site addresses included in a site visit address list carried by each agent program. The network has a number of network sites which are service provider sites. Each service provider site includes an address registry and data processing means programmed to collect site address information in the address registry from visiting agent programs. The data processing means is further programmed to insert site address information from the registry into the visit address list of succeeding agent programs which visit the site. By this means a distributed registry may be built up at the service provider sites of addresses which offer the same service or same category of service to visiting agent programs.

12 Claims, 3 Drawing Sheets

METHOD AND APPARATUS FOR ROUTING SERVICE REQUEST/AGENT PROGRAMS TO SERVICE PROVIDED SITES WHEREIN SAID PROGRAMS COMPRISE OF A LIST OF THE SITES VISITED

BACKGROUND OF THE INVENTION

The present invention relates to a method and system for routing agent programs through a communications network. The invention may be applied to communication networks such as the Internet which uses the Internet Protocol.

The Internet Protocol is used for transmitting data communication packets over a network of participating digital communication networks. The operation of the Internet Protocol is described in standard reference works which are generally available. The Internet is a global network of networks which operates according to the Internet Protocol and runs with a decentralized management.

The Internet includes local area networks and long haul public networks which allow packets to be communicated between the local area networks. The packets are transmitted between nodes in the network to sites each of which has a unique local network address. A data communication packet can be launched into the Internet from a user site via an access node connected to the Internet. The packet is forwarded through the network nodes to any target site connected to the network provided that the site address of the target site is included in a header of the packet.

Each packet communicated over the Internet is routed via a path which is determined by gateways and servers which switch the packet according to the target address and the availability of a network path to connect to the target site.

With the rapid growth of the Internet as a source of information and services, the selection of sites to be targeted for collection and understanding of information has become orders of magnitude more difficult. In an attempt to solve this, intelligent agent programs have been employed to interrogate and move from site to site within the Internet and procure services for the user. In order to do this the agent needs a list of destination sites that offer the service that is required. The user has to provide in the agent program a list of the sites to visit, or target a directory of valid sites from which to obtain the addresses of the sites to be visited. Alternatively, the agent program may move randomly.

The current attempts to use intelligent program agents result in an inefficient search pattern or an extended search time.

SUMMARY OF THE INVENTION

The present invention aims to provide an improved method and system for addressing program agents within a communications network.

According to the present invention, there is provided a communications network comprising a plurality of interconnected network sites, and switching means to route agent programs through the communications network by reference to site addresses included in a site visit address list carried by each agent program, wherein the network has a network site which includes;

an address registry;

and data processing means programmed to collect site address information in the address registry from visiting agent programs and further programmed to insert site address information from the registry into the visit address list of succeeding agent programs which visit the site.

The present invention also provides a method of routing agent programs through a communications network comprising a plurality of interconnected network sites, and switching means to route the agent programs through the communications network by reference to site addresses included in a site visit address list carried by each agent program, the method comprising the steps of;

collecting and registering site address information from the address lists of agent programs visiting a site in the network;

and inserting such address information in the visit address list of succeeding agent programs which visit the site.

BRIEF DESCRIPTION OF THE DRAWINGS

The invention will now be described, by way of example, with reference to the accompanying drawings in which.

DETAILED DESCRIPTION

Figure 1:
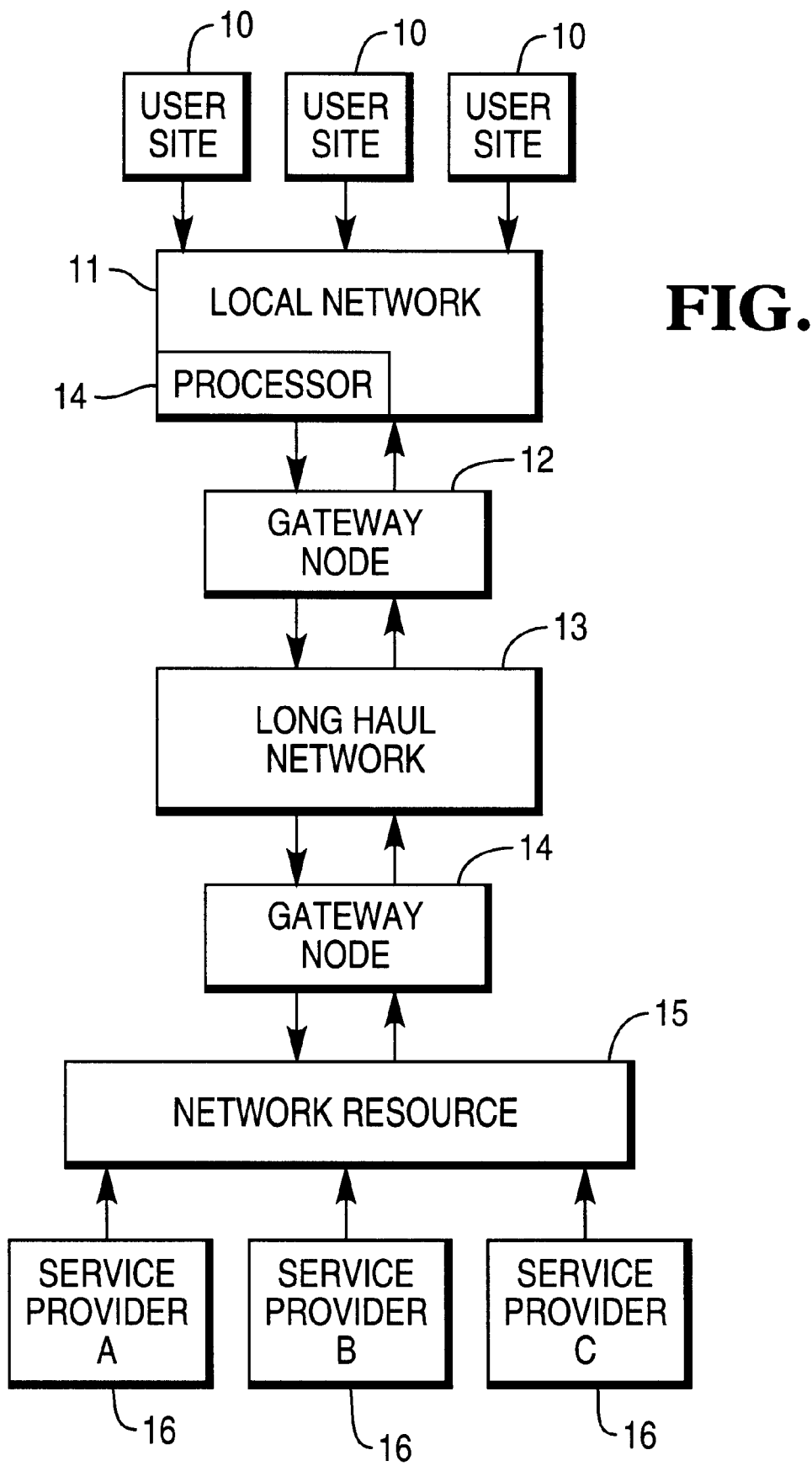
FIG. 1 is a schematic block diagram of a communications network embodying the present invention.

In FIG. 1, a first plurality of user sites 10 are connected into a local area network 11. The number of sites 10 is shown as three but it will be understood that in practice there are a multiplicity of such user sites 10. The local network is connected via a gateway node 12 into a long haul network 13. The local network 11 includes a data processor 14 which receives service requests from the user sites via I/O ports connected individually to the user sites 10. The processor 14 acts to communicate the service requests through the gateway node 12 to the long haul network 13.

Figure 2:
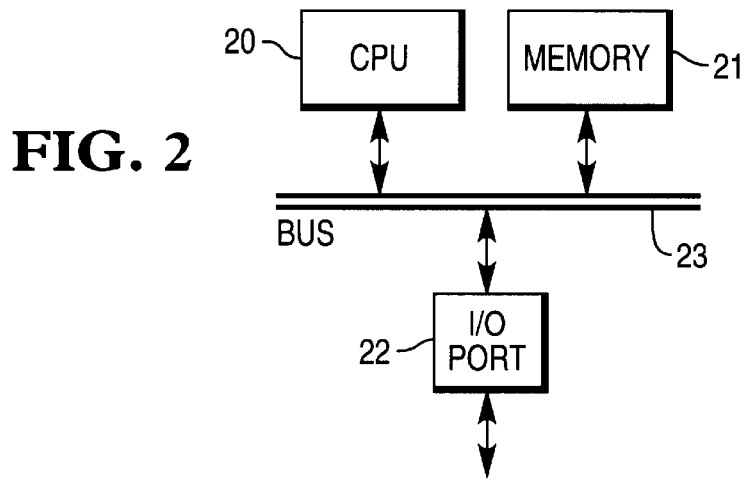
FIG. 2 shows elements included in a user site in the network of FIG. 1.

The local network 11 is one of a number of such local networks connected to the long haul network 13 although orly one local network 11 is shown in FIG. 1. Each user site 10 on any one of the local networks 11 has a configuration as shown in FIG. 2. The user sites each have a CPU 20, a memory 21 and an I/O port 22. The various elements of the user site are interconnected by a data bus 23. The I/O port is coupled into the local network 11 for communication between the user site and the local network.

Figure 3:
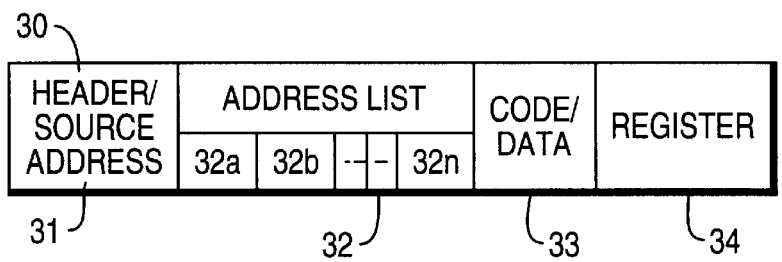
FIG. 3 shows elements of an agent program which is communicated through the network of FIG. 1.

The CPU 20 operates under the control of an operating program stored in the memory 21 to formulate service requests to be communicated via the I/O port 22. The service requests are compiled by the CPU in the form of agent programs. An agent program 30 includes packets of digital information divided into fields as shown in FIG. 3.

The agent programs 30 include a header and source address field 31. The source address indicates the site address of the user site 10 from which the agent program 30 is launched into the communications network. An address field 32 includes sub fields 32a, 32b . . . 32n each of which may contain the address of a target site in the network. The user at the user site 10 employs the CPU 20 to enter a target address into one of the address sub fields or an address into each of a number of the address sub fields. The user at the user site 10 is thus able to make up a visit list of sites to be visited by the agent program, the visit list including a minimum of one site address.

The sub address fields 32a, 32b, . . . 32n also each include a visit flag V which is settable to indicate when the respective address has been visited. The address list is thus divisible, according to the setting of the visit flags, into two address lists. One address list is a list of addresses to be visited and the other address list is a list of addresses which have been visited. The sub address fields also include an unsuccessful flag U which is settable to indicate when the respective address has proved to be unavailable. The purpose of the visit and unsuccessful flags will be explained later.

A code and data field 33 includes program instructions for the network sites to be visited by the agent program. A register field 34 is a field to register data collected by the agent program.

Reverting now to FIG. 1, the user sites 10 are each capable of formulating a user request for service which is in the form of an agent program in the manner described with reference to FIGS. 2 and 3. The service request is communicated via the I/O port 22 of the user site to be passed by way of the gateway node 12 to the long haul network 13. The local network 11 and the longhaul network 13 include switching and addressing circuits to direct each agent program through a path in the network to reach a destination selected by an address in the address field 32 of the agent program. The path through the network ultimately directs the agent program through a gateway node 14 to a network resource 15. The network resource includes service provider sites 16.

Each service provider site 16 has a site address which may be included in the address list to be visited by an agent program launched from a user site 10. As will be apparent to those skilled in the art, the network resource 15 will, in practice, constitute one of a multiplicity of such network resources each having one or more service provider sites 16.

Figure 4:
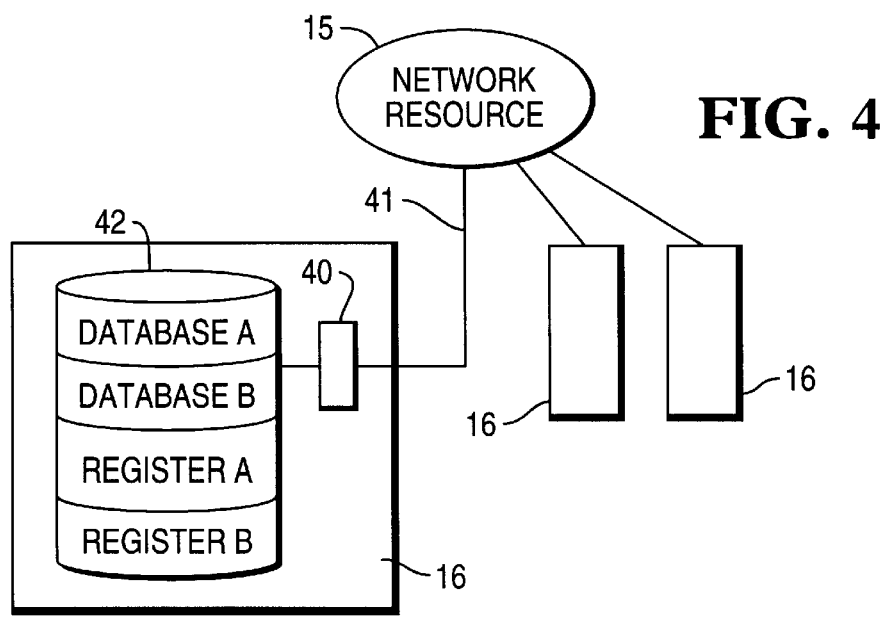
FIG. 4 shows network resources connected to the network of FIG. 1.

The configuration of a service provider site is shown in FIG. 4 and includes a processor 40 having an agent reception port 41 and a memory 42. The memory 42 includes databases A and B which are accessible by visiting program agents 30. A visiting program agent may collect information from a database in the memory 42 to be entered into the register field 34 of the program agent. The search for and selection of the information from one or more of the databases A and B is controlled by the program instructions included in the code and data field 33. The memory 42 also includes registrys A and B associated respectively with the databases A and B.

The method by which the agent programs are processed in each of the service provider sites will now be described with reference to FIG. 5. The network is indicated generally by the reference 60 to include the source of agent programs A to N. Each of the agent programs includes the code and data field, the data register and address lists already described.

Upon reception of an agent program by the I/O port 41 of a service provider A, the CPU 40 at that site confirms in step 50 that the site address targeted by the agent program matches the site address of the service provider A. The CPU 40 submits the agent program to a security check in step 51 to ensure that the agent program is authorized to access the database A or B available at that service provider site. Upon satisfactory completion of the security check, the CPU 40 updates either registry A or B in step 52 according to whether the visiting agent program has requested access to the corresponding database A or B.

Each registry A or B consists of a list of addresses. The addresses in each registry A or B are of service provider sites which offer the same service or the same category of service as the service provider A. If a visiting program agent selects data from database A, the addresses in the corresponding registry A will be updated by the CPU 40 in step 52. If a visiting agent program selects data from the database B, the addresses in the corresponding registry B will be updated.

The updating of the list of addresses in either registry A or B includes a comparison between the addresses already included in the registry with both the source address of the visiting agent and the visit list in the address field 32 of the visiting agent. Those addresses which are revealed in the comparison to be missing from the registry at the provider site A are added to the list. The service provider is thus able to accumulate in steps 52 and 53 addresses read from the visiting program agents which refer to provider sites offering the same service or the same category of service as the provider site A. The visit flag against each address in the address field 32 of a visiting agent indicates whether that address has been visited. In the case of an address that is still to be visited, the CPU reads from the visit flag that the address is a potential but not verified address and marks it in the provider registry accordingly.

The CPU reads from the unsuccessful flag U whether an address has proved to be unavailable and marks that address in the provider registry accordingly. The CPU 40 is programmed to count the number of times an address is marked as unavailable and to remove that address if it is marked in the provider registry as unavailable more than a preset number of times. The preset number may be 3.

In step 54, the CPU 40 compares the addresses already included in the provider address list with the addresses in the address list of the visiting program agent. Sites providing the same service as the provider A but not already included in the agent address list are added to the agent list. It will be apparent that through the steps 52, 53 and 54, the service provider is able to collect addresses from successive visiting program agents so as to build up and continually maintain a registry of addresses of provider sites offering the same service or the same category of service. In addition, each succeeding visiting program agent is able to add to its address list the addresses collected from preceding program agents requesting the same service or same category of service.

In the step 55, the program agent is entered into the runtime environment where the service data requested by the program agent is entered into the program register field 34. Following the step 55, the program agent is relaunched into the network in the step 56.

Figure 5:
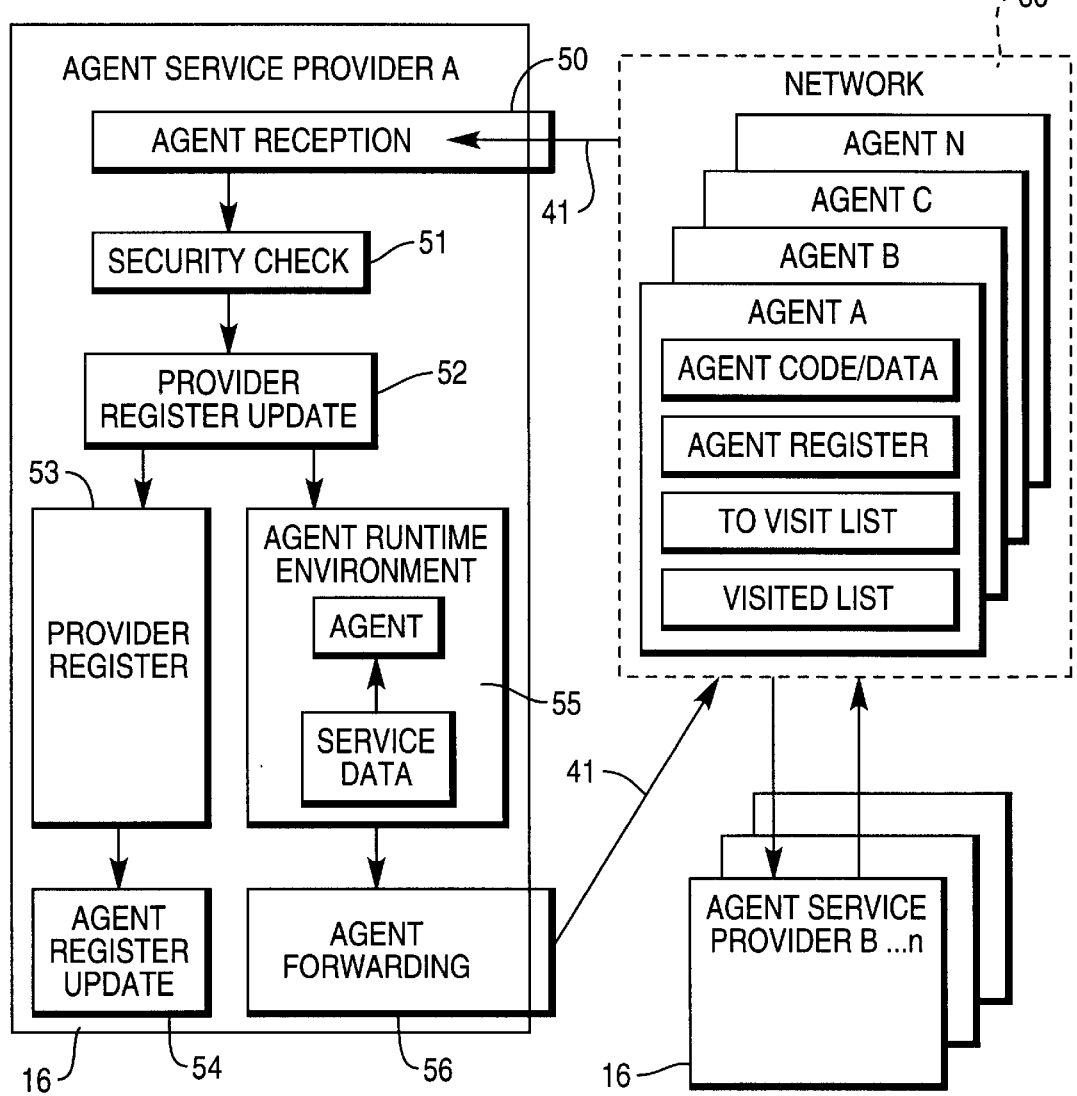
FIG. 5 shows, in schematic block form, the method of operation of the network of FIG. 1.

Once relaunched into the network, the program agent A may visit other service providers B . . . n as shown diagrammatically in FIG. 5. Each of such service providers includes a provider registry which collects addresses from the visiting program agents. The registrys at the different service providers together produce a comprehensive distributed registry of addresses in a short time, particularly when there is a large number of program agents active within the network.

The distributed registry of addresses is maintained automatically and is available to extend the number of sites where program agents can potentially obtain the service requested by the user who launched the program agent. This is achieved without user intervention.

The invention may be applied to a network in which each of the service providers 16 is a self service terminal such as a cash dispensing terminal. The self service terminals require both maintenance and replenishment from designated service sites also connected into the network. A home site on the network keeps information on the state of the network and on the need for pre-emptive maintenance or replenishment.

Authorized program agents are launched into the network to visit the self service terminals on a regular basis requesting information on the state of each terminal and thereby checking on the state of the network as a whole for monitoring at the home site. Each terminal keeps a maintenance registry of those sites available for providing repair or replenishment which is added to the data carried by the program agents. A visit by a program agent to a service site that is unavailable can be indicated in the address list of the program agent and this information can be collected by the terminals. The movement of agents enables a distributed maintenance registry shared between the terminals to be kept updated automatically. A terminal which requires maintenance or replenishment can launch an agent with a service request and direct it to a list of possible sites that could action the request. Service sites can go on and off line whilst ensuring that the general network is aware through the distributed maintenance registry of the options for obtaining service.

What is claimed is:

1. A communications network comprising:

a plurality of interconnected network sites, switching means for routing one or more agent programs through the communications network by reference to site addresses included in a site visit address list carried by each agent ptogram; and a network site including (i) an address registry, and (ii) data processing means programmed for collecting site address information in the address registry from visiting agent programs and further programmed for inserting site address information from the registry into the visit address list of succeeding agent programs which visit the site.

2. A communications network according to claim 1, wherein the data processing means is programmed to collect site address information which includes site addresses and visit flags indicating which addresses have been visited.

3. A communications network according to claim 1, wherein the data processing means is programmed to collect site address information which includes site addresses and unsuccessful flags indicating which addresses have been unavailable.

4. A communications network according to claim 1, wherein the network site including the address registry and data processing means constitutes one of a plurality of service provider sites.

5. A communications network according to claim 4, wherein the service provider sites are capable of launching an agent program into the network.

6. A communications network according to claim 5, wherein the service provider sites are self-service cash dispensing terminals.

7. A network site for connection to a communications network, the network site comprising an I/O port for the communication of one or more program agents into the network site from the network and from the network site into the network;

an address registry; and data processing means for receiving and processing one or more program agents visiting the network site and received through the I/O port, the data processing means being programmed to compare the addresses in the address list of a visiting program agent with addresses in the address registry both to update the address register and to update the address list of the visiting program agent.

8. A network site according to claim 7, wherein the data processing means is programmed to collect site address information which includes site addresses and visit flags indicating which addresses have been visited.

9. A network site according to claim 7, wherein the data processing means is programmed to collect site address information which includes site addresses and unsuccessful flags indicating unavailable addresses.

10. A method of routing one or more agent programs through a communications network comprising a plurality of interconnected network sites, and a switching unit for routing the agent programs through the communications network by reference to site addresses included in a site visit address list carried by each agent program, the method comprising the steps of:

collecting and registering site address information from the address lists of agent programs visiting a site in the network; and inserting such address information in the visit address list of succeeding agent programs which visit the site.

11. A method according to claim 10, wherein the step of collecting and registering site address information includes collecting and registering site addresses and visit flags indicating which addresses have been visited.

12. A method according to claim 10, wherein the step of collecting and registering site address information includes collecting and registering site addresses and unsuccessful flags indicating which addresses have been unavailable.

* * * * *

UNITED STATES PATENT AND TRADEMARK OFFICE
CERTIFICATE OF CORRECTION

PATENT NO. : 6,385,175 B1
DATED : May 7, 2002
INVENTOR(S) : Lee G. Dove

It is certified that error appears in the above-identified patent and that said Letters Patent is hereby corrected as shown below:

<u>Title page, Item [54] and Column 1, line 3,</u>
Title, "PROVIDED" should be -- PROVIDER --.

Signed and Sealed this

Thirty-first Day of December, 2002

JAMES E. ROGAN
*Director of the United States Patent and Trademark Office*